(12) United States Patent
Atherton et al.

(10) Patent No.: US 10,642,244 B2
(45) Date of Patent: May 5, 2020

(54) ROBOTIC AUGMENTATION OF CREATIVE TASKS

(71) Applicant: Autodesk, Inc., San Rafael, CA (US)

(72) Inventors: Evan Patrick Atherton, San Carlos, CA (US); David Thomasson, Fairfax, CA (US); Maurice Ugo Conti, Muir Beach, CA (US); Heather Kerrick, Oakland, CA (US)

(73) Assignee: Autodesk, Inc., San Rafael, CA (US)

( * ) Notice: Subject to any disclaimer, the term of this patent is extended or adjusted under 35 U.S.C. 154(b) by 287 days.

(21) Appl. No.: 15/384,236

(22) Filed: Dec. 19, 2016

(65) Prior Publication Data
US 2018/0173192 A1 Jun. 21, 2018

(51) Int. Cl.
*G05B 19/402* (2006.01)
*G05B 19/18* (2006.01)

(52) U.S. Cl.
CPC ......... *G05B 19/402* (2013.01); *G05B 19/188* (2013.01); *G05B 2219/37582* (2013.01); *G05B 2219/39004* (2013.01)

(58) Field of Classification Search
CPC .................... G05B 19/402; G05B 2219/37582
USPC ......................................................... 700/173
See application file for complete search history.

(56) References Cited

U.S. PATENT DOCUMENTS

| 4,675,502 | A | * | 6/1987 | Haefner | ................. | B25J 9/1684 |
| | | | | | | 219/124.34 |
| 2003/0135303 | A1 | * | 7/2003 | Arai | ....................... | B25J 9/1679 |
| | | | | | | 700/245 |
| 2011/0288667 | A1 | * | 11/2011 | Noda | ..................... | B25J 9/1661 |
| | | | | | | 700/98 |
| 2013/0071573 | A1 | * | 3/2013 | Brewer | ................ | B05B 13/005 |
| | | | | | | 427/421.1 |
| 2014/0012415 | A1 | * | 1/2014 | Benaim | .............. | G06K 9/00355 |
| | | | | | | 700/248 |
| 2014/0163730 | A1 | * | 6/2014 | Mian | ......................... | B25J 9/16 |
| | | | | | | 700/248 |
| 2014/0371905 | A1 | * | 12/2014 | Eberst | .................... | B25J 9/1671 |
| | | | | | | 700/253 |
| 2015/0128547 | A1 | * | 5/2015 | Einecke | ............... | A01D 34/008 |
| | | | | | | 56/10.2 A |
| 2015/0314442 | A1 | * | 11/2015 | Boca | ....................... | B25J 9/1664 |
| | | | | | | 700/253 |
| 2016/0303737 | A1 | * | 10/2016 | Rossano | ................. | B25J 11/005 |
| 2017/0336776 | A1 | * | 11/2017 | Watanabe | ............ | G05B 19/409 |

* cited by examiner

*Primary Examiner* — Ziaul Karim
(74) *Attorney, Agent, or Firm* — Artegis Law Group, LLP (57) ABSTRACT

A robot is configured to assist an end-user with creative tasks. While the end-user modifies the work piece, the robot observes the modifications made by the end-user and determines one or more objectives that the end-user may endeavor to accomplish. The robot then determines a set of actions to perform that assist the end-user with accomplishing the objectives.

21 Claims, 9 Drawing Sheets

ROBOTIC AUGMENTATION OF CREATIVE TASKS

BACKGROUND OF THE INVENTION

Field of the Invention

Embodiments of the present invention relate generally to robotics and, more specifically, to robotic augmentation of creative tasks.

Description of the Related Art

When generating an artistic work, an artist typically engages in a creative process of some kind. For example, a sculptor may examine a raw piece of stone and then develop a sculpting strategy to carve the raw stone into a desired shape. The creative process itself is difficult to define, but this process usually allows the artist to define a clear set of tasks that must be performed to generate the artistic work.

For instance, in the above example, the sculpting strategy may dictate that the raw stone should be formed into a cylindrical shape prior to the execution of more detailed sculpting. Historically, artists have outsourced some or all of these tasks to apprentices, especially ones that do not require the master skill level of the artist. In modern times, however, apprentices may not be readily available to assist artists or using apprentices may be too time consuming and inefficient.

As the foregoing illustrates, what is needed in the art is a more effective approach for creating artistic works or facilitating creative tasks.

SUMMARY OF THE INVENTION

Various embodiments of the present invention set forth a computer-implemented method for controlling a robot, including determining, based on sensor data, a first modification that has been applied to a work piece by an end-user, determining, based on the first modification, a second modification to apply to the work piece, where the second modification corresponds to the first modification, and causing a robot to apply the second modification to the work piece to assist the end-user in modifying the work piece.

At least one advantage of the techniques described herein is that the end-user need not manually perform all tasks required to perform the creative task. Instead, the robot may assume responsibility for at least a portion of those tasks

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
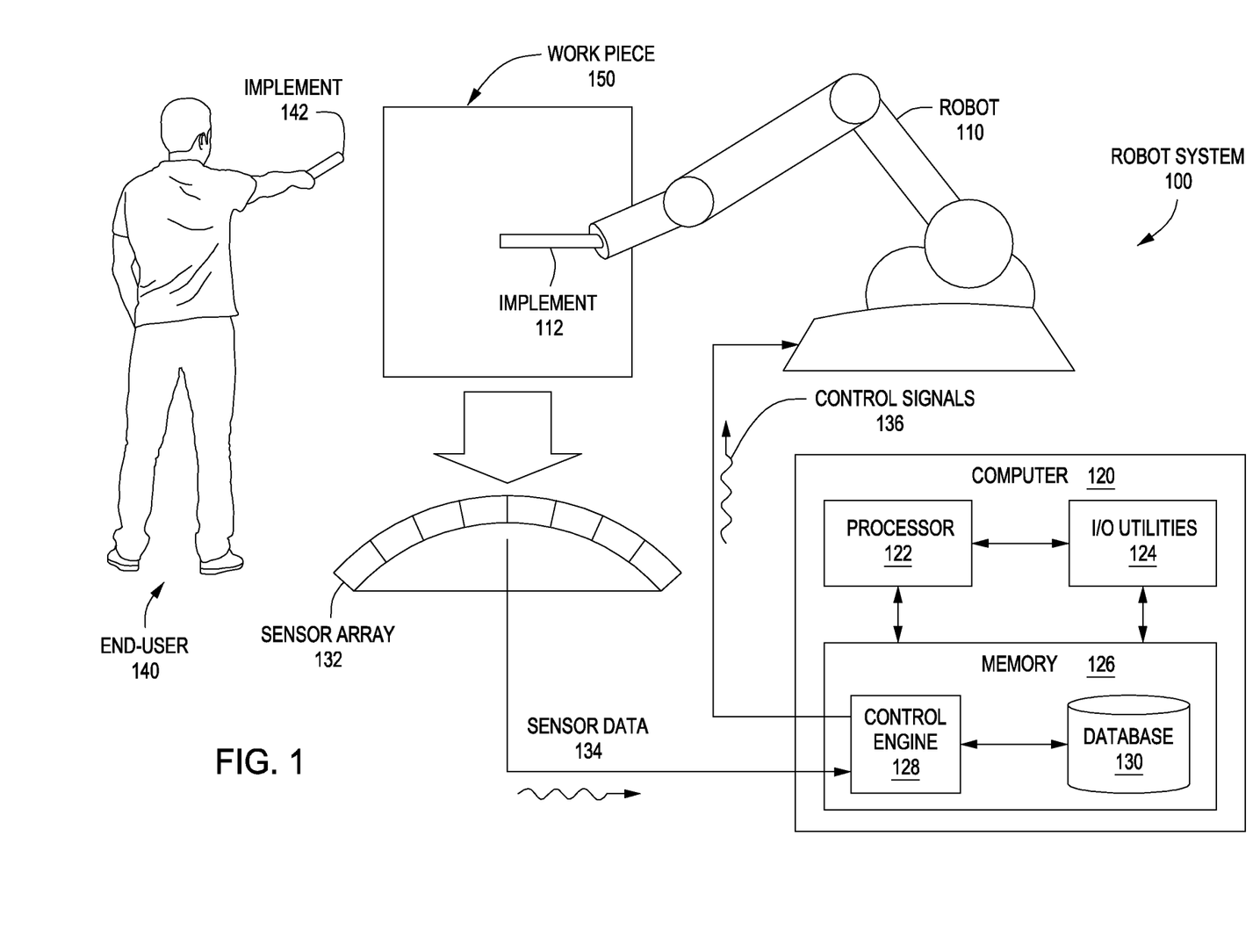
FIG. 1 illustrates a system configured to implement one or more aspects of the present invention.

FIG. 1 illustrates a system configured to implement one or more aspects of the present invention. As shown, robot system 100 includes a robot 110 coupled to a computer 120. Robot system 100 is configured to coordinate with an end-user 140 to modify a work piece 150. Work piece 150 may be any technically feasible structure, substance, object, or collection of objects capable of being modified. Robot system 100 modifies work piece via implement 112 coupled to robot 110. End-user modifies work piece 150 via implement 142. Implements 112 and 142 may be any technically feasible type of tool capable of performing modifications to work piece 150. Implements 112 and 142 may be specialized tools designed specifically for work piece 150, or general-purpose tools designed for a range of different purposes.

In an exemplary scenario, work piece 150 could be a canvas manufactured for painting. Implements 110 and 142 could be paintbrushes. Robot system 100 and end-user 140 could coordinate with one another to apply paint to that canvas using those paintbrushes. In another exemplary scenario, work piece 150 could be a slab of rough-hewn stone deemed favorable for sculpting. Implements 110 and 142 could be chisels. Robot system 100 and end-user 140 could coordinate with one another to chisel the slab of stone into a sculpture. Persons skilled in the art will recognize that a wide variety of work pieces exist, all of which fall squarely in the scope of the present invention.

In operation, computer 120 controls the actions of robot 110 when modifying work piece 150. Computer 120 includes processor 122, input/output (I/O) utilities 124, and memory 126, coupled together. Processor 122 may be any technically feasible form of processing device configured process data and execute program code. Processor 122 could be, for example, a central processing unit (CPU), a graphics processing unit (GPU), an application-specific integrated circuit (ASIC), a field-programmable gate array (FPGA), any technically feasible combination of such units, and so forth.

I/O utilities 124 may include devices configured to receive input, including, for example, a keyboard, a mouse, and so forth. I/O utilities 124 may also include devices configured to provide output, including, for example, a display device, a speaker, and so forth. I/O utilities 124 may further include devices configured to both receive and provide input and output, respectively, including, for example, a touchscreen, a universal serial bus (USB) port, and so forth.

Memory 126 may be any technically feasible storage medium configured to store data and software applications. Memory 126 could be, for example, a hard disk, a random access memory (RAM) module, a read-only memory (ROM), and so forth. Memory 126 includes a control engine 128 and a database 130. Control engine 128 is a software application that, when executed by processor 112, controls robot 110, as described in greater detail below.

Computer 120 is coupled to a sensor array 132 configured to capture sensor data 134 associated with work piece 150. Sensory data 134 indicates actions performed by end-user 140 and robot 110 relative to work piece 150. Sensor data 134 may include any technically feasible form of signal data, including visual signal data, audio signal data, and so forth. Generally, sensor data 134 includes a video feed depicting modifications made by end-user 140 and/or robot 110 to work piece 150. Control engine 128 is configured to receive and process sensor data 134 in order to generate control signals 136 for transmission to robot 110. Control signals 136 include various commands that can be executed by robot 110 to cause robot 110 to modify work piece 150, thereby assisting end-user 140. Control engine 128 is described in greater detail below in conjunction with FIG. 2.

Figure 2:
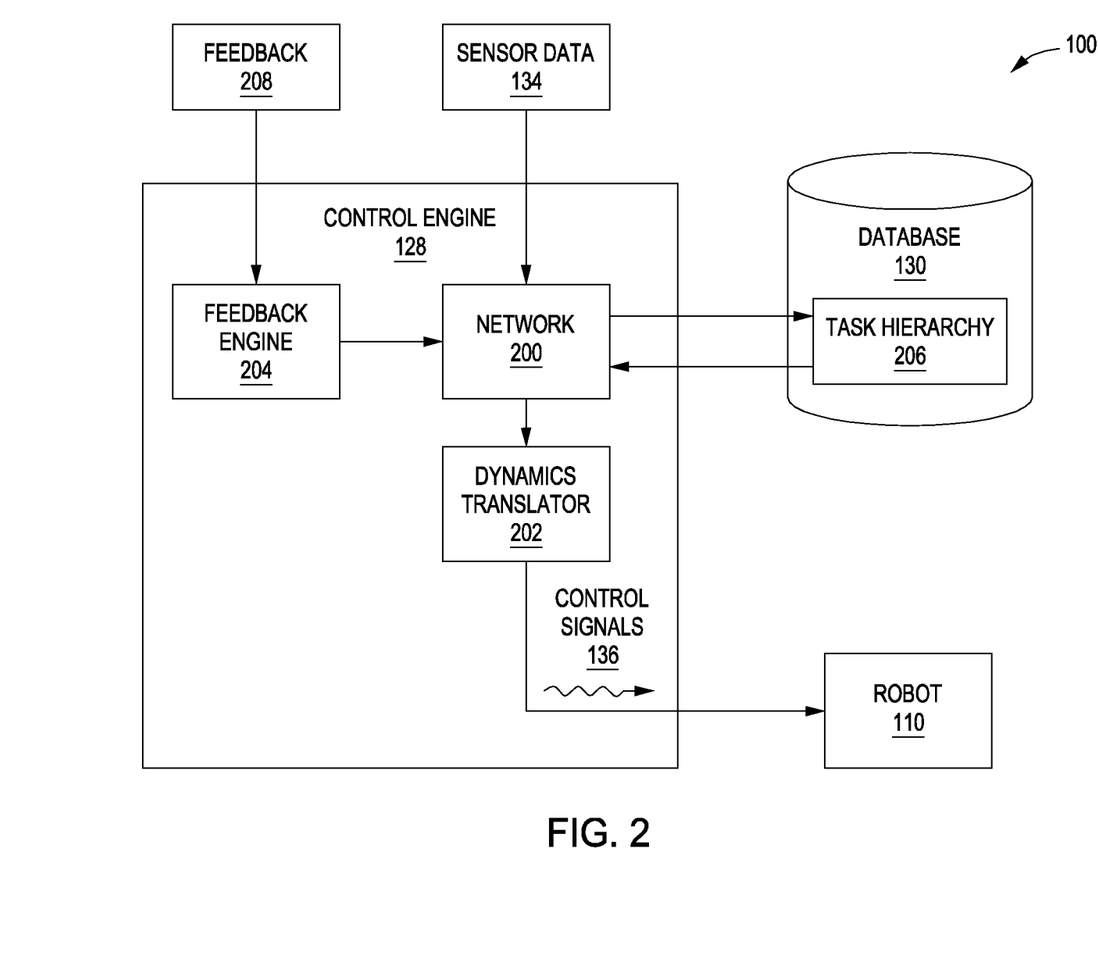
FIG. 2 is a more detailed illustration of the control engine of FIG. 1, according to various embodiments of the present invention.

FIG. 2 is a more detailed illustration of the control engine of FIG. 1, according to various embodiments of the present invention. As shown, control engine 128 includes a network 200, a dynamics translator 202, and a feedback engine 204. Control engine 128 is coupled to database 130, which includes a task hierarchy 206. Control engine 128 is configured to receive feedback 208 as well as sensor data 134.

Network 200 may be any technically feasible variety of artificial neural network, including a recurrent neural network or a convolutional neural network, among others. Network 200 generally receives structured or unstructured input and generates an output to dynamics translator 202. Dynamics translator 202 is configured to process the output of network 200 in order to generate control signals 136, which include commands to be executed by robot 110, as mentioned.

In operation, control engine 128 receives sensor data 134 indicating modifications made by end-user 140 and robot 110 to work piece 150. Network 200 processes this data to identify specific actions performed by end-user 140 as well as overall objectives indicated by those specific actions. For example, network 200 could identify that end-user 140 has chiseled a repeating pattern halfway around a slab of marble, and then determine that the overall objective of end-user 140 is to chisel the repeating pattern all the way around the slab of marble. Network 200 can be configured to identify a variety of different attributes describing the efforts of end-user 140 and to then generate output for assisting the end-user 140 with those efforts.

Network 200 is also configured to operate in conjunction with feedback engine 204. Feedback engine 204 receives feedback 208 that originates from end-user 140. Feedback 208 may include general indications describing the degree to which end-user 140 is satisfied with modifications performed by robot 110, or specific indications of tasks to be performed and/or guidance with performing those tasks. Feedback engine 204 is configured to process feedback 208 and to then apply adjustments to network 200 to accommodate that feedback. In doing so, feedback engine 204 may execute one or more training algorithms in order to apply those adjustments. For example, feedback engine 204 could execute a backpropagation algorithm to adjust one or more weights associated with network 200 based on feedback 208.

In one embodiment, network engine 200 is configured to access a task hierarchy 206 included in database 130. Task hierarchy 206 includes different sets of tasks organized into a hierarchy that includes "low-level" tasks at the lowest level and "high-level" tasks at the highest level. As referred to herein, a low-level task may include a highly granular operation, such as a single brush stroke, one pass with a carving knife, the drilling of a single hole, and so forth. By contrast, a high-level task may include a coarse operation, such as painting a tree, carving a certain design, or drilling a complex array of holes. Network 200, in processing sensor data 134 to generate output, may draw tasks from different levels of task hierarchy 206 depending on the output of feedback engine 204.

In one example of the above embodiment, if feedback engine 204 determines that end-user 140 is satisfied with modifications performed by robot 110, network 200 may access high-level tasks from task hierarchy 206. Conversely, if feedback engine 204 determines that end-user 140 is dissatisfied with modifications performed by robot 110, network 200 may subsequently access low-level tasks from task hierarchy 206. In this fashion, the granularity of tasks that robot 110 performs can reflect the degree to which end-user 140 is satisfied with previous tasks performed by robot 110.

As a general matter, control engine 128 processes sensor data 134 that represents modifications to work piece 150 and/or feedback 208 that represents the response of end-user 140 to those modifications and then adjusts the operations of robot 110 accordingly. In doing so, control engine 128 causes robot 110 to augment creative tasks performed by end-user 140 relative to work piece 150. This general approach is described in stepwise fashion below in conjunction with FIG. 3.

Figure 3:
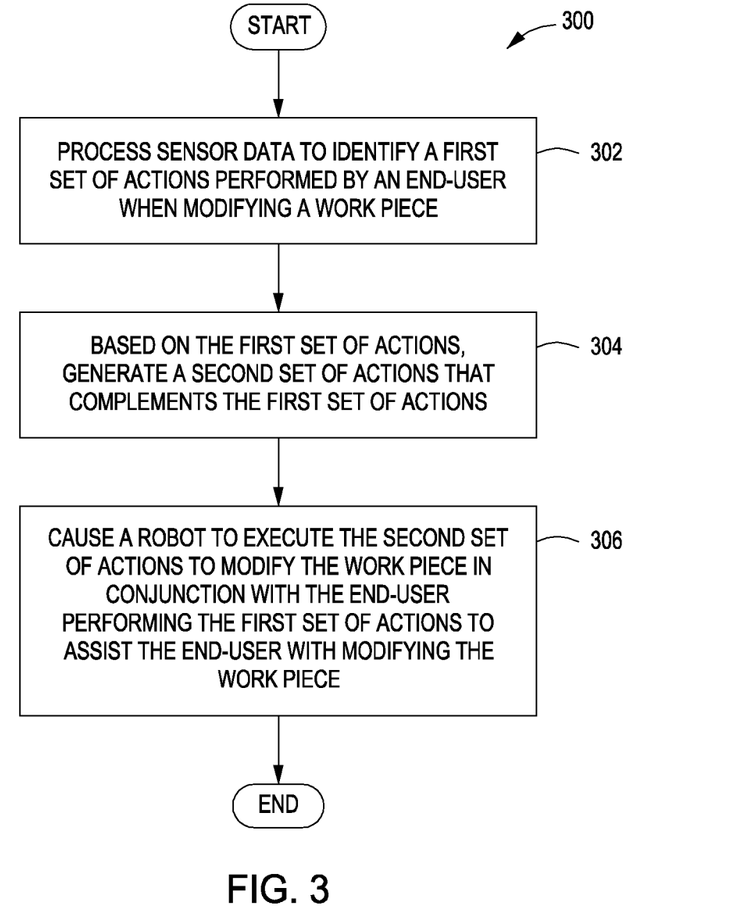
FIG. 3 is a flow diagram of method steps for assisting an end-user with modifying a work piece, according to various embodiments of the present invention.

FIG. 3 is a flow diagram of method steps for assisting an end-user with modifying a work piece, according to various embodiments of the present invention. Although the method steps are described in conjunction with the systems of FIGS. 1-2, persons skilled in the art will understand that any system configured to perform the method steps, in any order, is within the scope of the present invention.

As shown, a method 300 begins at step 302, where control engine 128 processes sensor data 134 to identify a first set of actions performed by end-user 140 when modifying work piece 150. The first set of actions may be highly granular, low-level tasks or high-level tasks such as long-term objectives.

At step 304, control engine 128 generates, based on the first set of actions, a second set of actions that complements the first set of actions. The second set of actions may include a repetition of the first set of actions, an extension to the second set of actions, or a creative divergence from the first set of actions. FIGS. 4A-5, 6A-7, and 8A-9 set forth examples of these respective possibilities.

At step 306, control engine 128 causes robot 110 to execute the second set of actions to modify the work piece in conjunction with end-user 140 performing the first set of actions, thereby assisting end-user 140 with modifying work piece 150.

Referring generally to FIGS. 1-3, an advantage of the augmentative techniques performed by robot system 100 is that end-user 140 may endeavor to perform various creative tasks without needing to manually perform each such task personally. Instead, end-user 140 may assume a mentorship role relative to robot system 100 and instruct or guide robot system 100 in performing the various tasks needed. Concordantly, robot system 100 may assume an apprenticeship role relative to end-user 140, thereby easing the burden of effort from end-user 140.

In doing so, robot system 100 may provide at least three different types of assistance to end-user 140. As described below in conjunction with FIGS. 4A-5, robot system 100 may detect and then replicate repetitive tasks on behalf of end-user 140, thereby mitigating the degree to which end-user 140 must perform such repetitive tasks. As described below in conjunction with FIGS. 6A-7, robot system 100 may observe and identify high-level goals towards which end-user 140 works, and perform complimentary actions that assist with attaining those high-level goals. As described below in conjunction with FIGS. 8A-9, robot system 100 may also determine a general theme associated with the actions of end-user 140, and then modify that theme based on previously observed themes to generate actions which diverge from those performed by the end-user 140.

Performing Repetitive Modifications on Behalf of the End-User

Figure 4A:
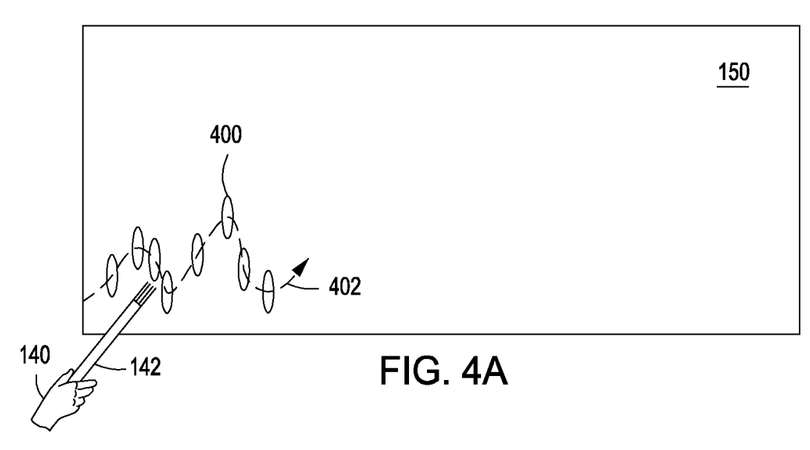
FIGS. 4A-4C illustrate how the robot system of FIG. 1 assists an end-user with one or more repetitive tasks, according to various embodiments of the present invention.
Figure 4B:
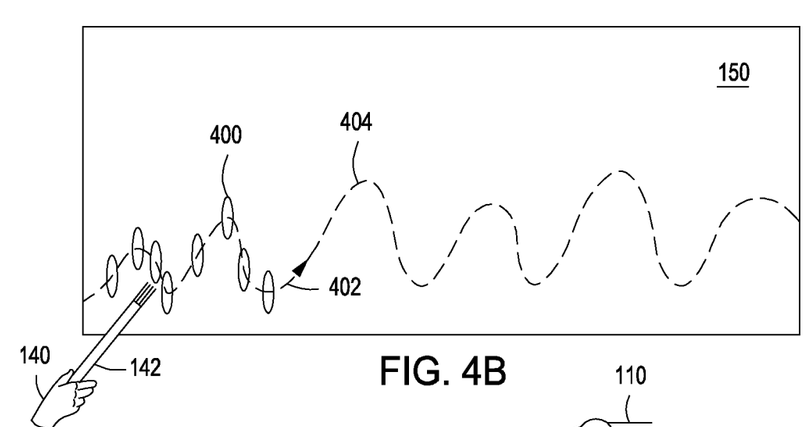
Figure 4C:
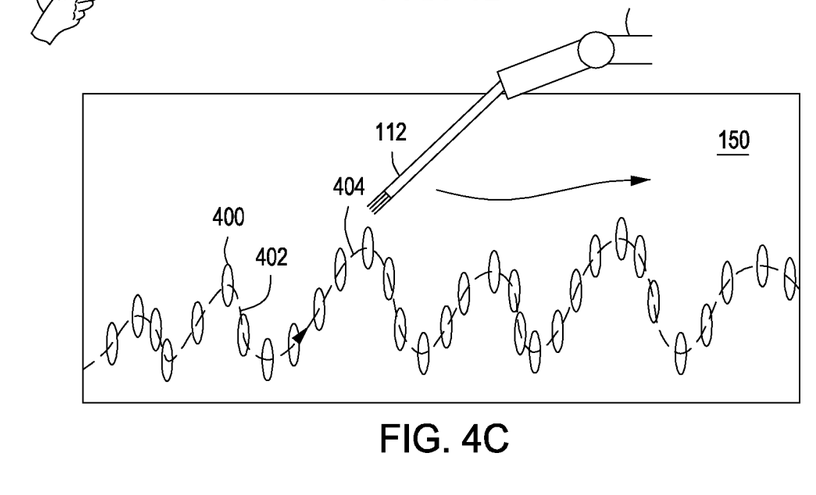

FIGS. 4A-4C illustrate how the robot system of FIG. 1 assists an end-user with one or more repetitive tasks, according to various embodiments of the present invention.

In FIG. 4A, end-user 140 uses implement 142 to paint a canvas-type work piece 150. In doing so, end-user 140 generates a repeating pattern of elements 400 that generally follows a path 402. Path 402 need not be explicitly drawn on work piece 150; in this discussion, path 402 simply indicates a trajectory end-user 140 may appear to follow when generating elements 400. Robot system 100 is configured to obtain sensor data 134 that represents the actions of end-user 140 when generating those elements.

In FIG. 4B, robot system 100 processes sensor data 134 to identify the repeating pattern of elements 400 partially painted by end-user 140. In doing so, control engine 128 may extrapolate path 402 to define path 404. Path 404 could represent, for example, data generated by control engine 128 within a simulated representation of work piece 150.

In FIG. 4C, robot system 100 causes robot 110 to paint additional elements 400 along path 404 using implement 112. In this manner, robot system 100 augments the efforts of end-user 140 by performing a repetitive task on behalf of end-user 140.

Referring generally to FIG. 4A-4C, persons skilled in the art will understand that these figures represent examples of different operations performed by robot system 100 that are not meant to limit the scope of the invention. As a general matter, robot system 100 is configured to identify any form of repeating pattern on any variety of work piece using any technically feasible approach, and to then operate to continue execution of that repeating pattern.

Figure 5:
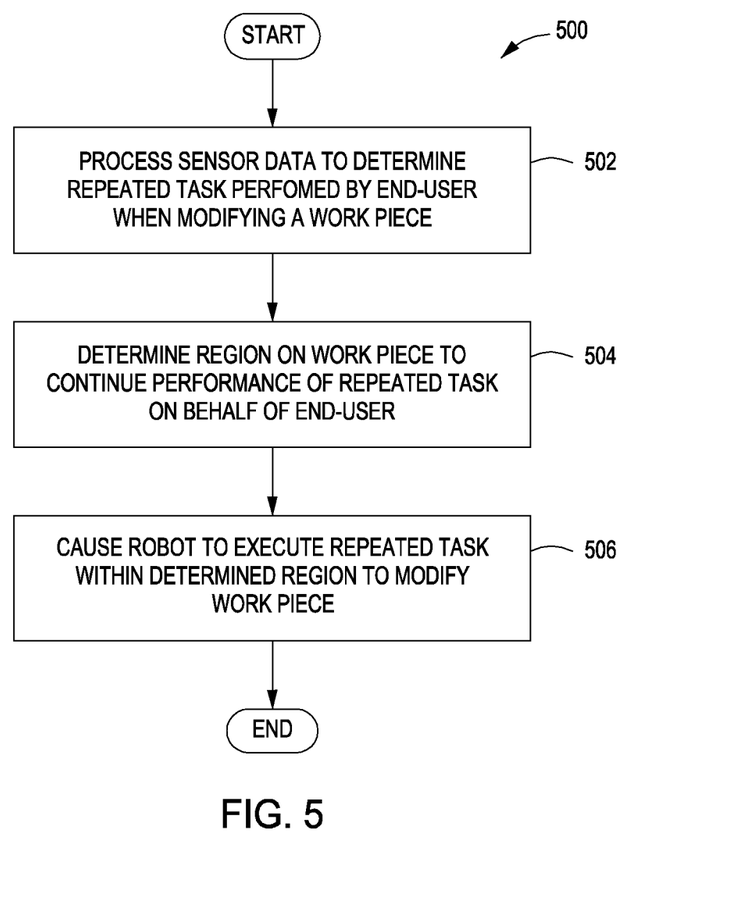
FIG. 5 is a flow diagram of method steps for causing a robot system to perform a repetitive task, according to various embodiments of the present invention.

FIG. 5 is a flow diagram of method steps for causing a robot system to perform a repetitive task, according to various embodiments of the present invention. Although the method steps are described in conjunction with the systems of FIGS. 1-4C, persons skilled in the art will understand that any system configured to perform the method steps, in any order, is within the scope of the present invention.

As shown, a method 500 begins at step 502, where robot system 100 processes sensor data 134 to determine a repeated task performed by end-user 140 when modifying work piece 150. The repeated task could be any type of action iteratively or repeatedly performed by end-user 140.

At step 504, robot system determines a region of work piece 150 to continue performance of the repeated task on behalf of end-user 140. For example, robot system 100 could determine that the repeated task performed by end-user 140 follows a specific path and/or involves a specific sequence of actions.

At step 506, robot system 100 causes robot 110 to execute the repeated task within the determine region to modify work piece 150. In doing so, robot system 100 may ease the burden of performing the repeated task from end-user 140, thereby augmenting execution of the creative task performed by end-user 140. Robot system 100 is also configured to perform higher-level tasks on behalf of end-user 140, as described below in conjunction with FIGS. 6A-7.

Performing Complimentary Modifications with the End-User

Figure 6A:
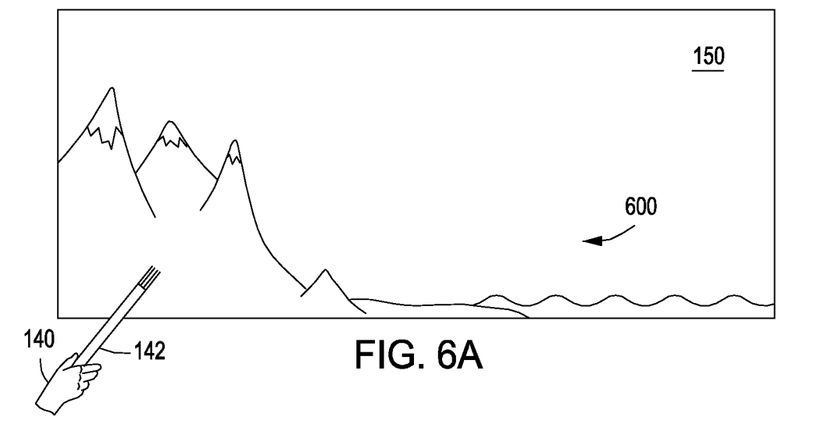
FIGS. 6A-6C illustrate how the robot system of FIG. 1 performs work piece modifications that complement end-user modifications to the same work piece, according to various embodiments of the present invention.
Figures 6B, 6C:
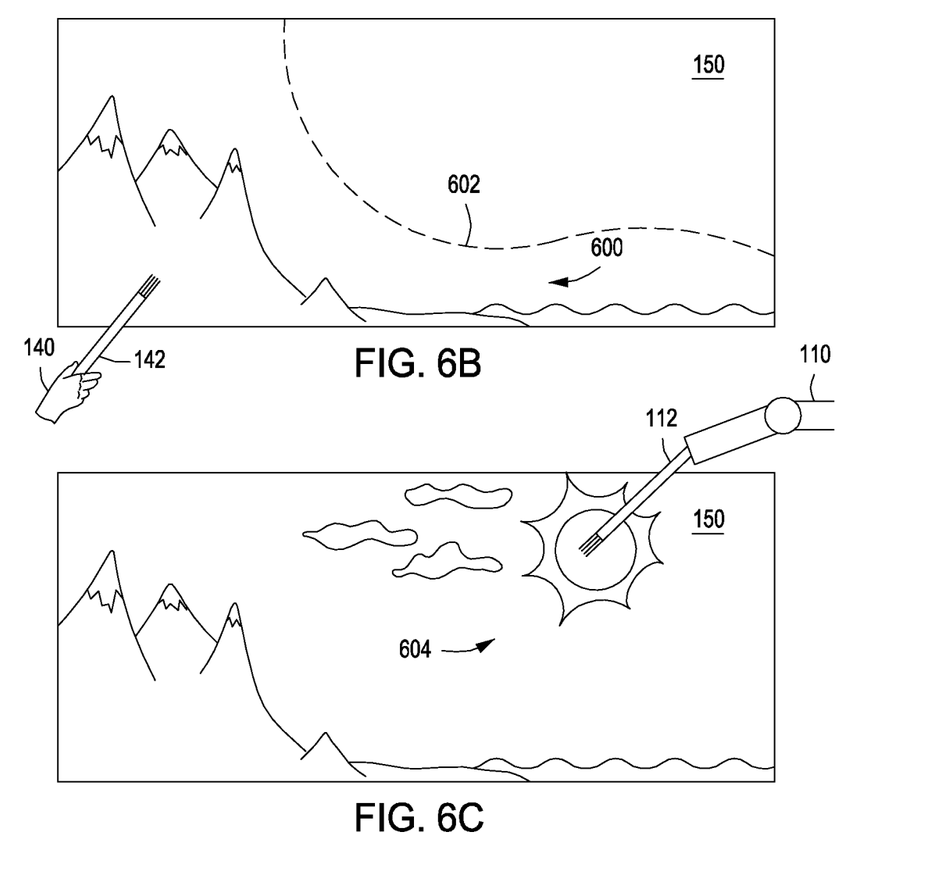

FIGS. 6A-6C illustrate how the robot system of FIG. 1 performs work piece modifications that complement end-user modifications to the same work piece, according to various embodiments of the present invention.

In FIG. 6A, end-user 140 uses implement 142 to paint a canvas-type work piece 150. In doing so, end-user 140 generates a landscape scene 600 that includes mountains sloping down to a beach area adjacent to a body of water.

In FIG. 6B, robot system 100 processes sensor data 134 to determine that end-user 140 is painting a landscape that currently lacks detail within a region 602. Robot system 100 may also determine that one high-level objective associated with work piece 150 is to paint something within region 602. In doing so, control engine 128 may implement computer vision techniques, paired with image analysis routines, to determine both the type of image painted on work piece 150 as well as regions, such as region 602, that are more or less blank. Then, robot system 100 may compute specific images to be generated within region 602, as described below.

In FIG. 6C, robot system 100 causes robot 110 to paint images 604 within region 602. In this example, images 604 include the sun and some clouds. In generating images 604, robot system 100 may compare work piece 150 to other landscape scenes and to then extrapolate these scenes to identify features of work piece 150 that are missing, compared to these other scenes.

For example, robot system 100 could process one thousand landscape scenes and identify a subset of those scenes that include mountain-like shapes and beach-like shapes. Then, robot system 100 could determine that many of the landscapes in the subset include sun-like shapes and/or cloud-like shapes. Robot system 100 could then generate images 604 to include such sun-like shapes and cloud-like shapes.

In one embodiment, robot system 100 may receive feedback 208 from end-user 140 indicating the degree to which end-user 140 approves of the modifications to work piece performed by robot 110. Based on that feedback, feedback engine 204 within control engine 128 may then adjust network 200. In this manner, the future actions of robot system 100 may dynamically reflect the success and/or failure of previous actions.

Referring generally to FIGS. 6A-6C, persons skilled in the art will understand that these figures represent examples of different operations performed by robot system 100 that are not meant to limit the scope of the invention. Generally speaking, robot system 100 is configured to identify any type of high-level objective associated with work piece 150, and to then determine, potentially based on examples of similar work pieces, specific actions that may assist with reaching the identified objective(s).

Figure 7:
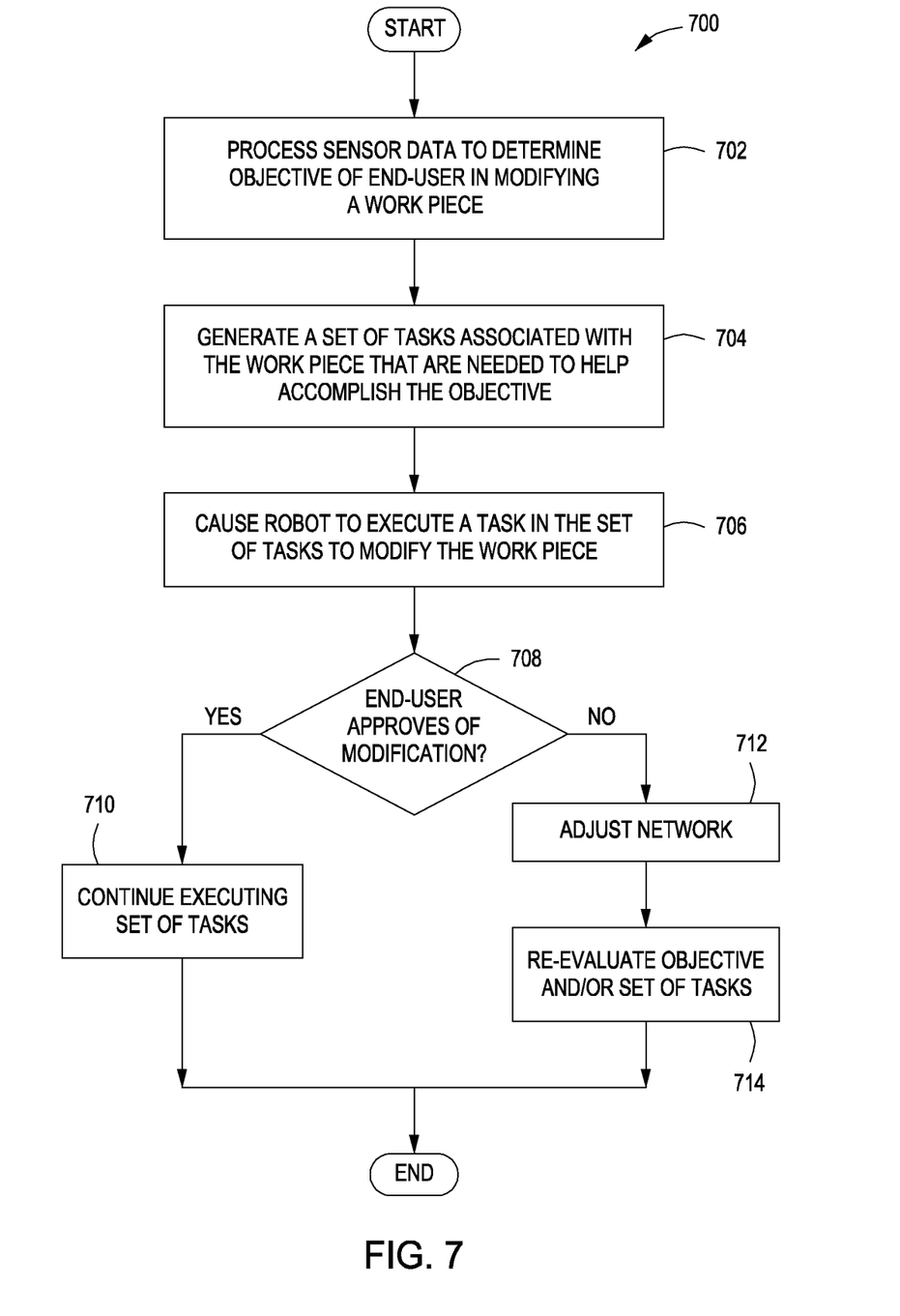
FIG. 7 is a flow diagram of method steps for generating complimentary modifications to a work piece, according to various embodiments of the present invention.

FIG. 7 is a flow diagram of method steps for generating complimentary modifications to a work piece, according to various embodiments of the present invention. Although the method steps are described in conjunction with the systems of FIGS. 1-6C, persons skilled in the art will understand that any system configured to perform the method steps, in any order, is within the scope of the present invention.

As shown, a method 700 begins at step 702, where robot system 100 processes sensor data 134 to determine an objective of end-user 140 in modifying work piece 150. In doing so, robot system 100 may employ computer vision techniques and/or image processing routines to both identify one or more features of work piece 150 generated by end-user 140 and, additionally, to identify one or more features that are missing from work piece 150.

At step 704, root system 100 generates a set of tasks associated with work piece 150 that are needed to help accomplish objective of end-user 140 determined at step 702. Robot system 100 could, for example, identify the one or more missing features of work piece 150, as discussed above, and then generate a set of tasks that could generate those missing feature(s).

At step 706, robot system 100 causes robot 110 to execute a task in the set of tasks to modify work piece 150. For example, robot system 100 could cause robot 110 to begin chiseling a portion of a shape onto a stone slab, where the shape itself represents the identified objective or missing feature.

At step 708, robot system 100 determines whether end-user 140 approves of the modification performed at step 706. If end-user 140 approves, robot system 100 proceeds to step 710, where robot system 100 continues to cause robot 110 to execute the tasks determined at step 704.

If end-user 140 does not approve of the modifications, then robot system 100 proceeds to step 712, where feedback engine 204 within control engine 128 adjusts network 200 based on the disapproving feedback received from end-user 140. Then, at step 714, robot system 100 re-evaluates the objective and/or set of tasks. In this manner, robot system 100 may continuously adapt to judgment provided by end-user 140. In one embodiment, robot system 100 may tune the granularity of tasks to be performed based on feedback received from end-user 140, as discussed above in conjunction with FIG. 2. Robot system 100 is also configured to perform tasks that are derived from, but do not necessarily represent, objectives of end-user 140, as described below in conjunction with FIGS. 8A-9.

Performing Modifications that Diverge from End-User Modifications

Figure 8A:
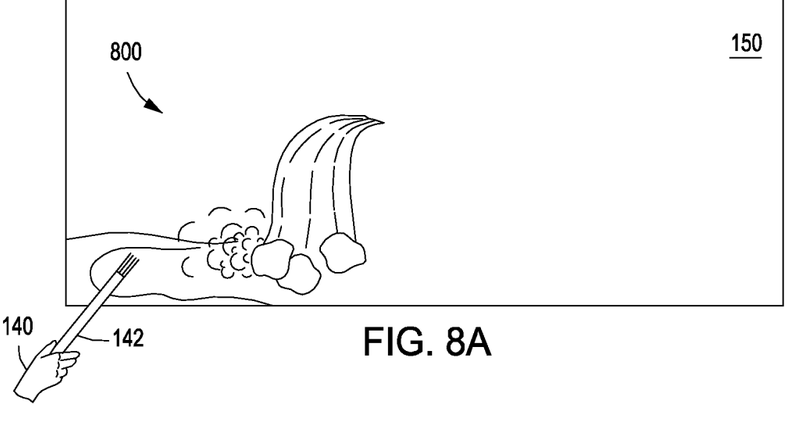
FIGS. 8A-8C illustrate how the robot system of FIG. 1 performs work piece modifications that creatively diverge from end-user modifications to the work piece, according to various embodiments of the present invention.
Figures 8B, 8C:
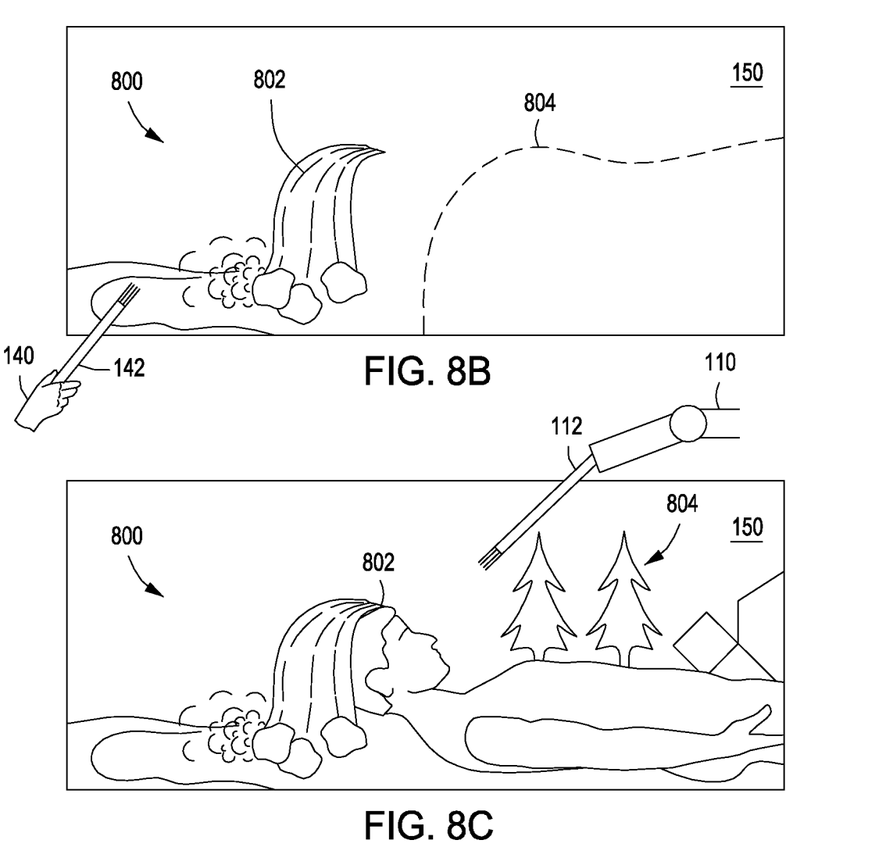

FIGS. 8A-8C illustrate how the robot system of FIG. 1 performs work piece modifications that creatively diverge from end-user modifications to the work piece, according to various embodiments of the present invention.

In FIG. 8A, end-user 140 uses implement 142 to paint a canvas-type work piece 150. In doing so, end-user 140 generates a nature scene 800 that includes a waterfall 802 tumbling into rocky pool.

In FIG. 8B, robot system 100 processes sensor data 134 to determine that end-user 140 is painting a nature scene that currently lacks detail within a region 804 that resides adjacent to waterfall 802. Robot system 100 may also determine that one high-level objective associated with work piece 150 is to paint something within region 804 that appears to derive from waterfall 802. However, in doing so, robot system 100 may also determine that the overall "nature" theme implemented by end-user 140 need not be closely followed, as described below.

In FIG. 6C, robot system 100 causes robot 110 to paint a female figure within region 804 having hair that appears to coincide with waterfall 802. In this fashion, robot system 100 may apply modifications to work piece 150 that are visually consistent with pre-existing modification but potentially diverge from the overall theme of work piece 150.

As an example, robot system 100 could process ten thousand images of various types and identify images or portions thereof having shapes akin to waterfall 802. Then, robot system 100 could identify a particular shape that will geometrically fit within region 804. Robot system 100 would then paint a version of that image within region 804, thereby extending the pre-existing imagery generated by end-user 140 in a manner that departs from the overall theme.

Referring generally to FIGS. 8A-8C, persons skilled in the art will understand that these figures represent examples of different operations performed by robot system 100 that are not meant to limit the scope of the maintains a parameter that represents a degree of divergence from the theme of work piece 150. Robot system 100 may adjust that parameter, to increase or decrease thematic divergence, based on feedback received from end-user 140.

Figure 9:
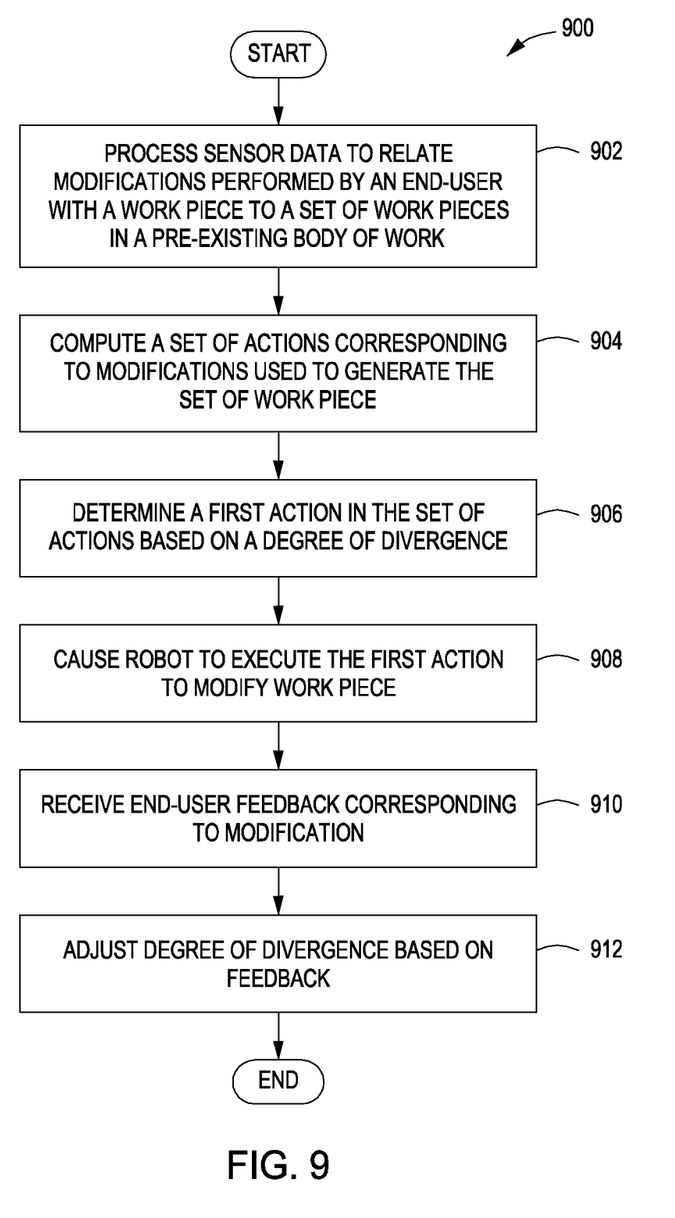
FIG. 9 is a flow diagram of method steps for generating divergent modifications to a work piece, according to various embodiments of the present invention.

FIG. 9 is a flow diagram of method steps for generating divergent modifications to a work piece, according to various embodiments of the present invention. Although the method steps are described in conjunction with the systems of FIGS. 1-8C, persons skilled in the art will understand that any system configured to perform the method steps, in any order, is within the scope of the present invention.

As shown, a method 900 begins at step 902, where robot system 100 processes sensor data 134 to relate modifications performed by end-user 140 with work piece 150 to modifications to a set of work pieces in a body of work. For example, robot system 100 could determine that work piece 150 includes a waterfall shape, as discussed in FIGS. 8A-8C, and then relate this shape to other work pieces. Those other work pieces may include waterfalls, or may include other shapes, such as a hair, that appear visually similar to waterfalls.

At step 904, robot system 100 computes a set of actions corresponding to the work pieces in the body of work. In the waterfall example, robot system 100 could compute a set of brush strokes needed to generate imagery adjacent to the waterfall shape. That adjacent imagery could include shapes associated with waterfalls, e.g. rocky pools, trees, and so forth, or imagery not typically associated with waterfalls, such as female hair.

At step 906, robot system 100 determines a first action in the set of actions based on a degree of divergence. As mentioned above, the degree of divergence is a parameter that controls how much or how little the modifications selected by robot system 100 depart from the theme of pre-existing modifications performed by end-user 140. If the degree of divergence is low, then robot system 100 may select actions that modify work piece 150 in a manner that adheres to the pre-existing theme of work piece 150. If the degree of divergence is high, then robot system 100 may select actions that depart from that theme. At step 908, robot system 100 causes robot 100 to execute the first action to modify work piece 150.

At step 910, robot system 100 receives feedback 208 from end-user 140 based on the modifications associated with the first action. Feedback 208 may represent the degree to which end-user 140 finds the modifications performed at step 908 favorable. At step 912, robot system 100 adjusts the degree of divergence based on feedback 208 received at step 910. In doing so, training engine 204 within control engine 128 may adjust and/or train network 200 increasingly or decreasingly adhere to the theme associated with work piece 150.

Referring generally to FIGS. 1-9, robot system 100 may be configured to interact with end-user 140 in any technically feasible way to coordinate activities, receive feedback, and so forth. In some embodiments, robot system 100 and end-user 140 take turns when modifying work piece 150. In other embodiments, robot system 100 and end-user 140 modifying work piece 150 in conjunction with one another. Persons skilled in the art will understand that any of the techniques described herein may be combined with one another in any technically feasible manner. For example, robot system 100 may execute repetitive tasks on behalf of end-user 140, yet augment these repetitive tasks to creatively diverge from those performed by end-user 140.

In sum, a robot is configured to assist an end-user with creative tasks. While the end-user modifies the work piece, the robot observes the modifications made by the end-user and determines one or more objectives that the end-user may endeavor to accomplish. The robot then determines a set of actions to perform that assist the end-user with accomplishing the objectives.

At least one advantage of the techniques described above is that the end-user need not manually perform all tasks required to perform the creative task. Instead, the robot may assume responsibility for at least a portion of those tasks. In addition, the robot may also contribute to performing the creative task using an unexpected and/or creatively divergent approach that is thematically different from the approach implemented by the end-user. Thus, the robot may also participate in guiding the overall evolution of the creative task.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A computer-implemented method for controlling a robot, the method comprising:

determining, based on visual sensor data, a first modification that has been applied to a work piece by an end-user;

determining, based on the first modification, a second modification to apply to the work piece, wherein the second modification corresponds to the first modification; and causing a robot to apply the second modification to the work piece via a separate implement in order to assist the end-user in modifying the work piece.

2. The computer-implemented method of claim 1, wherein determining the first modification comprises determining a first set of actions executed by the end-user relative to the work piece and determining the second modification comprises determining a second set of actions that are derived from the first set of actions.

3. The computer-implemented method of claim 2, wherein:
the first set of actions comprises a sequence of repeated operations applied to a first region of the work piece, and
the second set of actions comprises the sequence of repeated operations applied to a second region of the work piece.

4. The computer-implemented method of claim 1, wherein the first modification is associated with a first theme.

5. The computer-implemented method of claim 4, further comprising determining the second modification by:
comparing the work piece to one or more other work pieces;
identifying a subset of the one or more other work pieces that is associated with the first theme; and
extracting the second modification from the subset of the one or more other work pieces.

6. The computer-implemented method of claim 1, wherein the first modification is associated with a first theme, and the second modification is associated with a second theme.

7. The computer-implemented method of claim 6, further comprising determining the second modification by:
comparing the work piece to one or more other work pieces;
identifying a subset of the one or more other work pieces that includes at least one feature common to the work piece; and
extracting the second modification from the subset of the one or more other work pieces.

8. The computer-implemented method of claim 1, further comprising processing additional information received from the end-user to determine a third modification to the work piece.

9. The computer-implemented method of claim 8, wherein:
the third modification comprises a first number of actions,
the second modification comprises a second number of actions,
the first number of actions is greater than the second number of actions, and
further comprising strengthening, based on the additional information received from the end-user, at least one weight included in a neural network associated with the robot.

10. The computer-implemented method of claim 8, wherein:
the third modification comprises a first number of actions,
the second modification comprises a second number of actions,
the first number of actions is less than the second number of actions, and
further comprising weakening, based on the additional information received from the end-user, at least one weight included in a neural network associated with the robot.

11. The computer-implemented method of claim 1, wherein the visual sensor data includes a video feed depicting one or more modifications made to the work piece.

12. One or more non-transitory computer-readable media storing instructions that, when executed by one or more processors, cause the one or more processors to control a robot by performing the steps of:
determining, based on visual sensor data, a first modification that has been applied to a work piece by an end-user;
determining, based on the first modification, a second modification to apply to the work piece, wherein the second modification corresponds to the first modification; and
causing a robot to apply the second modification to the work piece via a separate implement in order to assist the end-user in modifying the work piece.

13. The one or more non-transitory computer-readable media of claim 12, wherein:
determining the first modification comprises determining a first set of actions executed by the end-user relative to the work piece; and
determining the second modification comprises determining a second set of actions that are derived from the first set of actions.

14. The one or more non-transitory computer-readable media of claim 13, wherein:
the first set of actions comprises a sequence of repeated operations applied to a first region of the work piece, and
the second set of actions comprises the sequence of repeated operations applied to a second region of the work piece.

15. The one or more non-transitory computer-readable media of claim 12, wherein the first modification is associated with a first theme.

16. The non-transitory computer-readable media of claim 15, further comprising instructions that, when executed by the one or more processors, cause the one or more processors to perform the step of determining the second modification by:
comparing the work piece to one or more other work pieces;
identifying a subset of the one or more other work pieces that is associated with the first theme; and
extracting the second modification from the subset of the one or more other work pieces.

17. The one or more non-transitory computer-readable media of claim 12, wherein the first modification is associated with a first theme, and the second modification is associated with a second theme.

18. The one or more non-transitory computer-readable media of claim 17, further comprising instructions that, when executed by the one or more processors, cause the one or more processors to perform the step of determining the second modification by:

comparing the work piece to one or more other work pieces;

identifying a subset of the one or more other work pieces that includes at least one feature common to the work piece; and extracting the second modification from the subset of the one or more other work pieces.

19. The non-transitory one or more computer-readable media of claim 12, further comprising instructions that, when executed by the one or more processors, cause the one or more processors to performs the step of receiving feedback from the end-user indicating a correction to be made to the second modification.

20. The non-transitory one or more computer-readable media of claim 19, further comprising instructions that, when executed by the one or more processors, cause the one or more processors to performs the step of adjusting a neural network associated with the robot to incorporate the correction.

21. A system for controlling a robot, comprising:
a memory storing an application; and
a processor that is coupled to the memory and, when executing the application, is configured to:
determine, based on visual sensor data, a first modification that has been applied to a work piece by an end-user,
determine, based on the first modification, a second modification to apply to the work piece, wherein the second modification corresponds to the first modification, and
cause a robot to apply the second modification to the work piece via a separate implement in order to assist the end-user in modifying the work piece.

* * * * *